Sept. 16, 1941.  H. MAZE  2,256,401
FASTENER
Filed June 27, 1940  2 Sheets-Sheet 1

Inventor
Hamilton Maze
By Thiess, Olsen & Mecklenburger
Attys.

Sept. 16, 1941.   H. MAZE   2,256,401
FASTENER
Filed June 27, 1940   2 Sheets-Sheet 2

Inventor:
Hamilton Maze
By: Thiess, Olsen & Mecklenburger
Attys.

Patented Sept. 16, 1941

2,256,401

UNITED STATES PATENT OFFICE 2,256,401

FASTENER

Hamilton Maze, Peru, Ill., assignor to W. H. Maze Company, Peru, Ill., a corporation of Illinois Application June 27, 1940, Serial No. 342,671

5 Claims. (Cl. 85—20)

This invention relates to fasteners, and more particularly to fasteners of the nail type used in building construction or wherever easily driven nails having exceptional holding power are desirable and wherein the shank is provided with a high pitch helical thread adapted to rotate the nail while it is being driven in place and to assist in providing holding power.

It will be apparent from the disclosure that certain features of the invention are adapted for use with various types of threaded shank fasteners although only specific embodiments are illustrated and described.

In threaded shank fasteners which are adapted to be hammer driven and to rotate while being driven home, the shanks are preferably rolled to provide very high pitch helical threads having comparatively sharp peaks and concave grooves between the peaks. Ordinarily a quadruple thread is used, as this type of thread meets general requirements satisfactorily and is comparatively easy to manufacture; however, it will be apparent that any appropriate number of threads may be used.

When ordinary screws are driven by means of a screw driver, the upper side of the thread exerts pressure outwardly against the fibers of the material and toward the head of the screw to thereby draw the screw inwardly as it is rotated. However, with nail-like fasteners having high-pitch threads of the type disclosed herein, and which fasteners are adapted to be hammer driven, the bottom or lead side of the thread presses inwardly against the fibers to rotate the fastener and the upper or lag side of the thread tends to draw away from the adjacent fibers of the material, thereby leaving a narrow space between the lag side of each thread and the material into which the nail is driven. Therefore, the thread space made by the fastener as it enters the material tends to be slightly wider than the thread itself, and this tends to leave the fastener slightly loose in the material and the fasteners may tend to "draw," "back out," or "pop," as it is sometimes called. This causes a great deal of dissatisfaction with this type of fastener, and it is often necessary for dealers, contractors, and manufacturers to make costly adjustments on structures using such fasteners.

The high pitch thread of the ordinary fastener and the concave flutes enable the fasteners to be easily driven into supports and to rotate with the thread while entering. This ease in driving is due to the smooth under-surface, or lead surface, of the thread which exerts a sliding pressure against the fibers of the material as the fasteners are driven into place. It is an object of the present invention to provide a helical fastener of the type described which is very easy to drive and will rotate when driven in the usual manner, and in which means is provided to greatly increase the holding power of the fastener after it is completely inserted.

A further object is to provide a fastener in which the holding means is so related to the thread and so positioned on the shank as to provide a maximum holding power without material destruction of the wood fibers and with a minimum resistance to driving.

Another important object is to provide a threaded shank nail which will have a minimum resistance to driving and a minimum resistance to rotation while the nail is being driven and wherein the nail is so constructed as to provide maximum resistance to rotation when the nail is pulled. In other words, the threaded shank is constructed in such a manner that it rotates easily while entering the wood because the wood fibers offer very little frictional resistance to the smooth lead side of the thread; however, the construction of the lag side of the thread is such that when a pulling force is applied a sufficient number of wood fibers are engaged by ratchet-like teeth to normally prevent rotation and to thereby exert a maximum holding power.

Further objects will be apparent from the specification and the appended claims.

Figure 1:
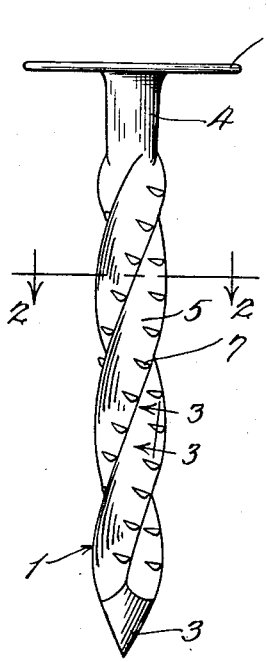
Fig. 1 is a side elevation of a threaded fastener particularly adapted for roll roofing, and illustrates one embodiment of the invention.

Referring to the drawings in detail, the embodiment illustrated in Figs. 1 to 6, inclusive, comprises a relatively small-diameter threaded and pointed shank 1 having a comparatively large and very thin flexible head 2 thereon. The entire nail is preferably of malleable material, and there is a definite correlation between the dimensions and other characteristics of the head and other parts and the characteristics of the nail, which, in this embodiment, provides a nail particularly adapted for securing roll roofing in place. It will, of course, be understood that the means for increasing the holding power and the relationship of this means to the threaded shank are adaptable for use in connection with any suitable type of threaded shank fastener which is adapted to rotate when hammer driven.

The shank is preferably sharply pointed at 3, and may be formed by rolling or otherwise to provide a multiple thread over a material portion of its length, as shown. That portion of the shank adjacent the head may be rectangular or round in shape and may be unthreaded, as shown at 4.

Figure 2:
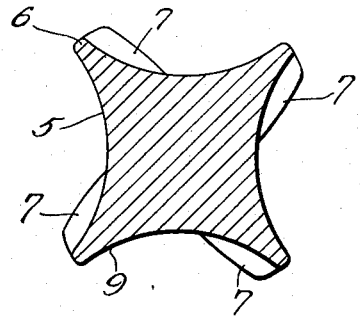
Fig. 2 is a transverse sectional view through the shank of the embodiment illustrated in Fig. 1, and is taken on a line substantially corresponding to line 2—2 of Fig. 1.

In the present embodiment a quadruple thread is used and is shown in transverse section in Fig. 2. The threads are preferably concave, as shown at 5, and are provided with slightly truncated tops or peaks 6 which, when quadruple threads are used, are rectangularly positioned in any cross-sectional area, as shown. The peaks and concave flutes fade out into the pointed end in any suitable manner. However, in any case, it is preferable that no part of the point or leading portion has a cross-sectional diameter greater than a corresponding following portion; that is, the longitudinal contour of the point forms a reduced continuation of the threaded shank.

Figure 3:
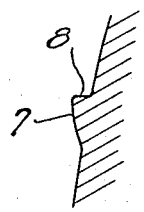
Fig. 3 is a detail sectional view through one of the holding lugs or teeth, and is taken on a line substantially corresponding to line 3—3 of Fig. 1.

A series of lugs or teeth 7 are provided on the upper or lag side of each thread adjacent the peak or top of the thread, and these lugs preferably extend angularly transversely of the concave flutes, as shown in Fig. 1, and each tooth terminates substantially at the center line of the corresponding flute, as shown in Fig. 2. In other words, the lugs 7 form ratchet-like teeth substantially as shown in Fig. 3, and provide shoulders 8 facing toward the head of the nail. The teeth extend from the top of the thread toward the center of the flute and fade out substantially at, or short of, the center line of the flute. This construction leaves the entire length of the leading or bottom side of the thread smooth and unobstructed, as shown at 9.

The shoulders 8 are very small, and as they are positioned entirely on the lag side of the thread,—that is, the side which tends to draw away from the fibers as the nail is being driven,—the driving resistance of the nail is not materially greater than an entirely smooth threaded fastener of the same type. However, after the nail is driven, the fibers of the material extend over the shoulders 8 and provide a very greatly increased pulling resistance. As will be described later, this resistance prevents rotation of the nail by pulling strain and thereby enables the threads to exert their maximum nonrotating holding power.

Figure 4:
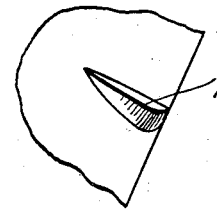
Fig. 4 is an enlarged side elevation of one of the teeth illustrated in Fig. 1.

By placing the teeth 7 in the angular position shown in Figs. 1 and 4, or, in other words, so that the shoulder is perpendicular to the thread angle at the peak of the thread, there is no tendency for the fibers to slide endwise of the shoulder 8, and a maximum pulling resistance is obtained. Also, the angular position of the teeth facilitates quantity production of the fasteners, as it conforms more easily with manufacturing requirements.

Figure 5:
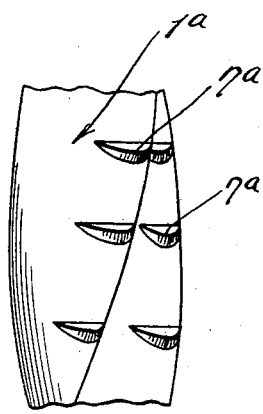
Fig. 5 is an enlarged view of a portion of the threaded nail shank provided with teeth perpendicular to the axis of the shank instead of angular thereto as in Fig. 1.

In some instances it is desirable to position the teeth as illustrated in Fig. 5, in which a portion of a threaded shank is illustrated. In this embodiment, the shank 1a is provided with a suitable helical thread which may be of the same type as previously described and is provided with teeth 7a which are positioned with respect to the peaks and flutes of the threads in the same manner as previously described, with the exception that the shoulders of the teeth 7a are perpendicular to the axis of the shank.

The teeth may be distributed as desired. However, in both of the embodiments illustrated, it is desirable, for convenience in manufacturing, that the teeth on the various threads should not be staggered, but that the corresponding teeth in all of the threads should be in the same horizontal plane, as shown in Figs. 1 and 5.

Figure 6:
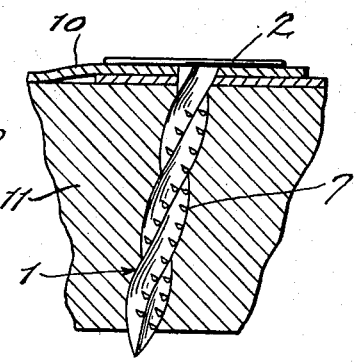
Fig. 6 is a side elevation of one of the flexible head nails shown in Fig. 1 as applied to a roof to secure roll roofing in place, and illustrates the adaptability of the flexible head when the fastener is driven in tilted or angular position, the roll roofing and sheathing being shown in section.

Fig. 6 illustrates one of the fasteners as used for securing roll roofing in place. Roll roofing 10 is overlapped, as shown, on sheathing or any suitable support 11. Such nails are often driven so that the shank 1 is somewhat angular with relation to the surface of the support, and, in order to secure the roofing and seal the shank opening, the head 2 is of flexible material and may be constructed substantially as shown in United States Patent No. 2,001,932, which illustrates and describes a nail similar to that disclosed herein.

In driving the nail, the point 3 first punctures the roll roofing 10, and then enters the sheathing or other support 11 and rotates slowly in accordance with the high pitch of the threads. The nail may be driven very easily, as the leading surface of the thread is smooth and unobstructed and tends to press the fibers downwardly leaving a small space above the threads which enables the teeth 7 to move freely without any material resistance against the fibers. However, as soon as the shank is completely embedded, any outward pressure is resisted by the engagement of the teeth with the overlapping fibers in a manner to prevent rotation, and the holding power of the nail is thereby greatly increased.

Figure 7:
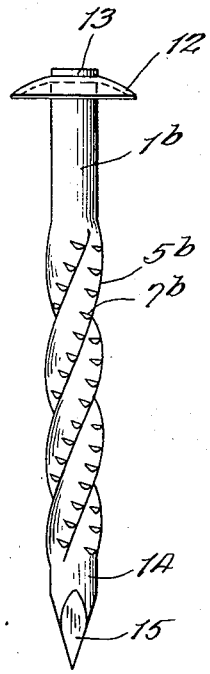
Fig. 7 is a side elevation of another embodiment of the invention comprising a nail particularly adapted for fastening corrugated metal to a support.
Figure 8:
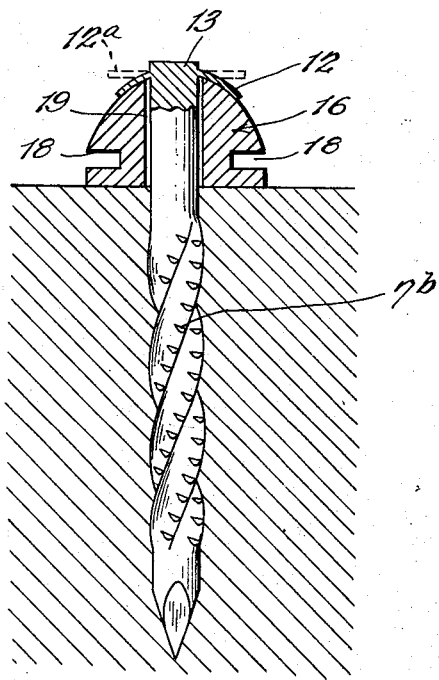
Fig. 8 is a side elevation partially in the section of the embodiment shown in Fig. 7 as used in connection with a testing block.

The embodiment illustrated in Figs. 7 and 8 is particularly intended for securing the usual corrugated roofing or siding to a support and comprises an elongated shank 1b provided with helical threads 5b having ratchet-like projections or teeth 7b thereon. The threads 5b and the teeth 7b may be substantially identical with the threads 5 and the teeth 7 previously described. The threads 5b may, if desired, cover substantially the entire length of the shank. However, in the present embodiment they terminate short of the ends and the shank is provided with a cup-shaped flexible head 12 having a projection 13 thereon in line with the shank for driving purposes. The threads 5b fade out or may end abruptly adjacent the point of the shank substantially as shown and the shank is preferably provided with a short pilot portion 14 of the normal diameter of the shank and of materially less diameter than the outside diameter of the thread. The shank is pointed at 15.

In securing corrugated metal very serious problems have arisen for the reason that moisture enters the structure under the heads of the nails and through the openings in the corrugated metal through which the shank of the nail passes. Corrugated metal is subject to very great stresses due to expansion and contraction caused by sudden changes of temperature and by the intense heat of the material exposed to the sun. This causes very great pulling strains to be applied to the nails, thereby causing "backing out" or "drawing" of the fasteners and allowing the metal to become loose, as well as allowing water to enter through the nail holes. In the present invention the smooth lead side of the thread enables the fastener to be easily driven and to easily rotate while it is entering the support and the teeth 7b offer substantially no resistance to driving as they pass freely through the clearance space formed between the lag side of the thread and the wood fibers.

Figure 9:
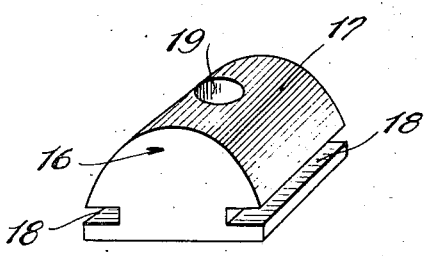
Fig. 9 is a perspective view of the testing block shown in Fig. 8.
Figure 10:
Fig. 10 illustrates an embodiment in which the nail is provided with the usual flat nail head.

Fig. 8 illustrates one of the nails driven into a support to secure a testing block 16 in the same relationship as the usual corrugated metal when secured to a support. The testing block 16 is shown in perspective in Fig. 9 and comprises an elongated block with its upper surface 17 having a transverse contour corresponding to the usual contour of a corrugation of the metal through which the nails normally are driven. The block is provided with longitudinal slots 18 in which a tool may be engaged for pulling the nail. The nail shank extends through a hole 19 in the block when it is driven into the support. While the nail is being driven snugly in place as shown in Fig. 8, it rotates freely and the flexible cup-shaped head 12 when seated conforms to the transverse contour of the block in the same manner that it conforms to the surface contour of the corrugated metal.

It has been found by test that, if an ordinary threaded corrugated metal fastener is driven through the test block into a support as shown in Fig. 8 and pulling force is applied to the block 16, the nail will rotate as it is withdrawn from the support and the head will tend to straighten out more or less as indicated by the dotted lines 12a. In other words, the fibers do not provide sufficient frictional resistance against the smooth upper side of the thread to prevent rotation of the nail. Therefore, the threads follow the grooves out of the support in the same manner that they enter.

It has also been found that, when a nail of the present invention is used with the test block as shown in Fig. 8, a very much greater pulling force is required to pull the nail, and the nail will not rotate during removal. The head 12, therefore, retains the form shown and snugly engages the curvature of the testing block irrespective of any pulling strain placed thereon. It has also been found that, in order to withdraw the nail, sufficient pulling force must be applied to the block to rupture or tear the wood fibers and a considerable amount of the fibrous material of the support is withdrawn with the nail. This test very effectively shows the increased holding power of the nail and demonstrates the fact that the nail does not rotate during withdrawal and the head will always conform to the shape of the metal corrugation irrespective of the amount of pulling force applied thereto.

The ordinary barbed nail tears the fibers as it is being driven into wood and thereby weakens their holding power. In the present invention, the barbs, lugs, or the like are so constructed and positioned relative to the thread that the fibers are not torn or otherwise interfered with during driving, but the nail cannot be pulled without actually rupturing and tearing the fibers. This provides an easy driving nail which automatically locks against pulling.

It is intended, of course, that the invention should not be limited to the specific embodiment or embodiments disclosed herein, since modifications may be made, and it is contemplated, therefore, by the appended claims, to cover any such modifications as fall within the true spirit and scope of this invention.

Having thus described this invention, what is claimed and desired to be secured by Letters Patent is:

1. A building nail of the character described comprising a small-diameter elongated pointed shank having a rolled high-pitch, helical, multiple thread, each thread being symmetrical in cross section and having a substantially sharp peak line, said shank being symmetrically concave between the peak lines of adjacent threads, each thread having a series of closely spaced projecting shoulders distributed along the lag side thereof with their outer ends terminating at the said peak line and their inner ends tapering toward, and terminating short of, the center line of the concavity between adjacent peak lines.

2. In a rolled building nail the combination with a shank having high-pitch, multiple, symmetrical threads with substantially sharp peak lines and symmetrically concave flutes intersecting at each peak line, said threads having smooth unobstructed lead surfaces, of a series of closely adjacent projections solely on the lag surfaces of said threads and constructed to provide shouldered teeth coterminous with the peak of the thread and constructed to present an angular outer surface toward the point of the nail to provide minimum resistance to driving and a substantially flat shoulder facing the head of the nail to provide maximum resistance to pulling, said shoulders being substantially perpendicular to the pitch angle of the peak line of the thread, and the corresponding projections of adjacent threads being in substantially the same transverse plane.

3. In a rolled building nail the combination with a shank having concave high-pitch multiple flutes forming symmetrical radially-extending threads with sharp peak lines, said threads having unobstructed lead surfaces, of a series of ratchet-like teeth solely on the lag side of each thread and coterminous with the peak of the thread and tapering toward the center line of the flute, each tooth extending from the peak to substantially the bottom of each thread and forming shoulders facing toward the head end of said nail.

4. In a rolled building nail the combination with a small-diameter shank having concave high-pitch multiple flutes forming symmetrical radially-extending threads with sharp peak lines, said threads having unobstructed lead surfaces, of a series of closely adjacent ratchet-like teeth solely on the lag side of each thread, each tooth extending substantially from the peak toward the bottom of each thread and forming a tapered shoulder facing toward the head end of said nail, said shoulders being substantially perpendicular to the pitch angle of the said threads, and the corresponding teeth of adjacent threads being in substantially the same transverse plane.

5. A building nail comprising a pointed shank having a driving head, said shank having rolled therein high-pitch helical flutes intersecting to form symmetrical radially-extending fins over a material portion of its length, the leading side of each fin being substantially smooth and unobstructed, and elongated laterally-projecting shoulders facing said head and extending substantially from the top to the bottom of each fin on the lag side thereof and taping toward the center line of the corresponding flute.

HAMILTON MAZE.